United States Patent [19]

Gaffney

[11] 4,248,323
[45] Feb. 3, 1981

[54] ELECTRIC VEHICLE WITH DISPLACEABLE BATTERY PACK

[75] Inventor: Edward N. Gaffney, West Midlands, England

[73] Assignee: Lucas Industries Limited, Birmingham, England

[21] Appl. No.: 896,957

[22] Filed: Apr. 17, 1978

[30] Foreign Application Priority Data

Apr. 22, 1977 [GB] United Kingdom ............. 16771/77

[51] Int. Cl.³ .............................................. B62D 25/08
[52] U.S. Cl. .................................. 180/291; 180/68.5
[58] Field of Search ................ 180/11, 12, 65 R, 68.5, 180/291, 295

[56] References Cited

U.S. PATENT DOCUMENTS

| Re. 28,675 | 1/1976 | Hobbensiefken | 180/11 |
| 4,027,737 | 6/1977 | Garry | 180/11 |

FOREIGN PATENT DOCUMENTS

| 874109 | 4/1953 | Fed. Rep. of Germany | 180/11 |
| 743938 | 1/1956 | United Kingdom | 180/11 |

Primary Examiner—John J. Love
Assistant Examiner—Michael Mar
Attorney, Agent, or Firm—Ladas & Parry

[57] ABSTRACT

A vehicle which is driven by an electric motor provided with a battery pack, or by an internal combustion engine, comprises a main body portion and a frame which is slidable with respect to the main body portion and which carries the internal combustion engine or electric motor and battery pack and at least one pair of driven wheels, and a transmission connecting the engine or motor to the driven wheels. The frame is movable between a closed position and an extended position by actuation of the engine or motor, the extended position affording access to the engine or to the motor and battery pack.

4 Claims, 3 Drawing Figures

ELECTRIC VEHICLE WITH DISPLACEABLE BATTERY PACK

This invention relates to vehicles which are driven by an internal combustion engine or by electrical power obtained from a battery pack and supplying drive to wheels of the vehicle. Vehicles of the kind with which the invention is concerned have the power supply and transmission system and the wheels which are driven thereby at the same end of the vehicle. The engine or motor will be referred to as the power supply means.

It is usual in such vehicles to provide access to the power supply means through a door or similar arrangement but this inevitably provides only limited accessibility. Furthermore, removal of a substantial part of the power supply means, such as a battery pack or a complete engine or transmission unit is more difficult with such limited access and may require, instead, some dismantling. Also the use of external lifting equipment is often needed for removal of such a unit.

It is the object of the invention to provide a vehicle of the kind specified in which access to the power supply system is rendered convenient without the need for major, and particularly power operated, external equipment. This facilitates repair or maintenance work.

According to the invention, there is provided a vehicle of the kind specified in which the power supply and transmission system are mounted on a frame which also carries at least one pair of wheels, at least one of which is arranged to be driven by the power supply and transmission system, the frame being carried on the vehicle through lockable slide means, the arrangement being such that the frame can occupy a closed position in which the power supply and transmission system is enclosed within the vehicle and an extended position in which said system is accessible from outside the vehicle, said frame being movable from one position to the other by actuating the power supply means to move the frame on said slide means.

The invention will now be described by way of example with reference to the accompanying drawings, in which.

Figure 1:
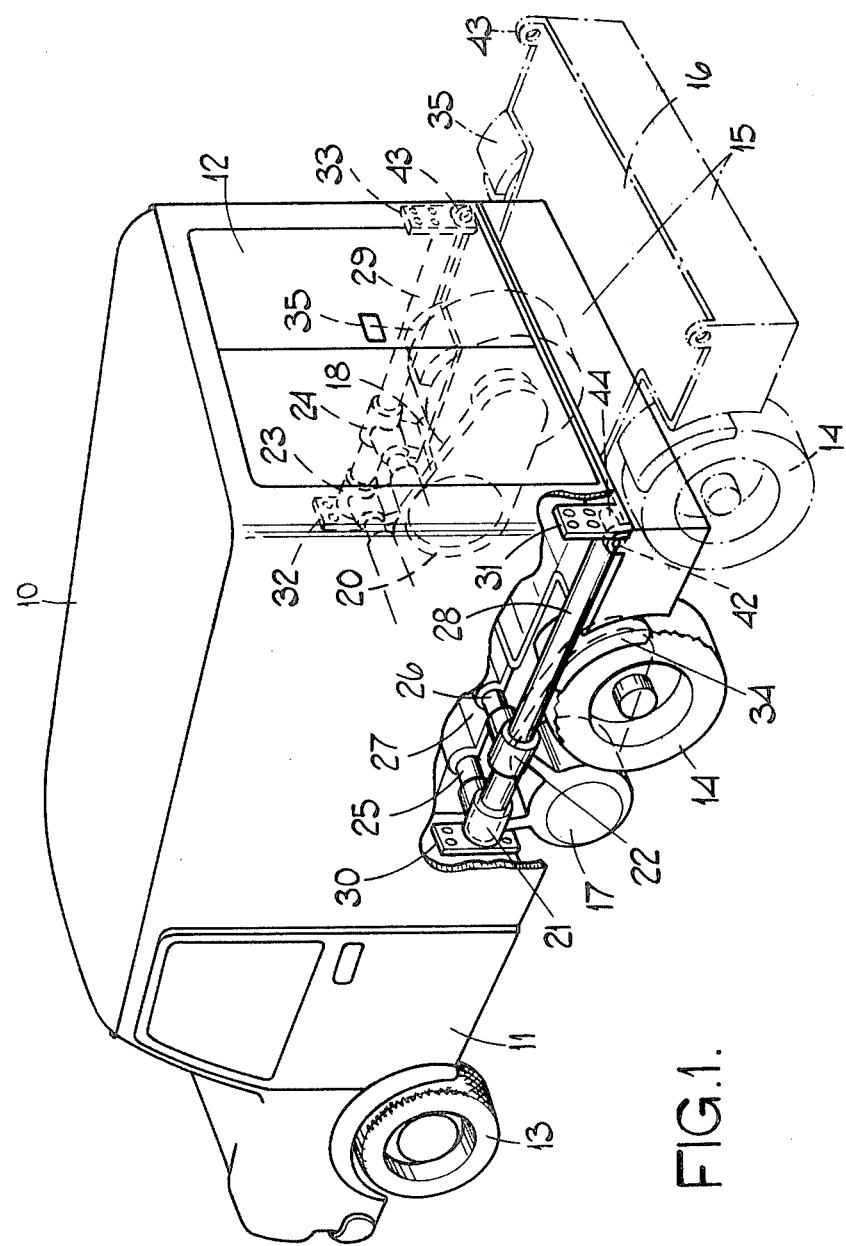
FIG. 1 is a perspective view of a vehicle having electric drive and incorporating the invention.

FIG. 1 shows a vehicle having a body 10. The body has front doors 11 giving access to a driver's cab and rear doors 12 which give access to a goods carrying compartment within the body. Such compartment has a flat floor (not shown) extending through to the cab. Carried on the body 10 or a chassis to which it is secured is a pair of steerable front wheels 13. The vehicle also has a pair of rear wheels 14.

Figure 2:
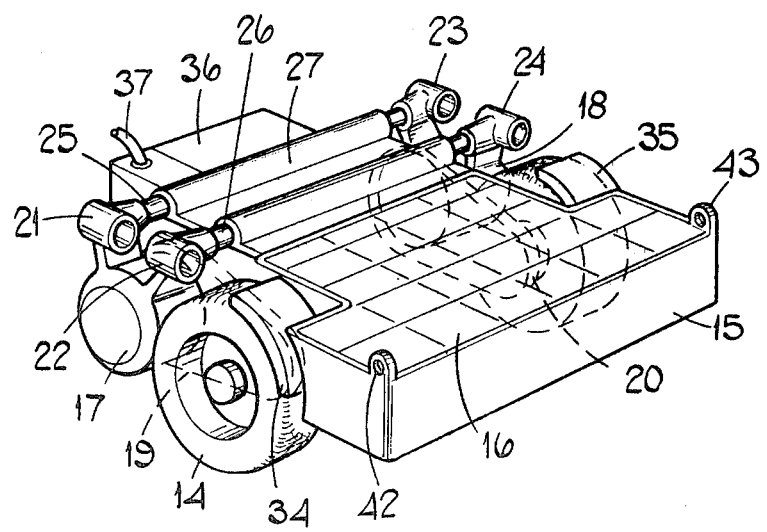
FIG. 2 is the electric drive assembly of the vehicle.

The rear wheels 14 are, however, mounted on an assembly also shown in FIG. 2. This assembly comprises a frame 15 to which all the components are attached and in the form of an open topped box. This frame 15 carries a battery pack comprising a plurality of individual batteries indicated at 16. Also carried on the frame are two electric motors 17, 18. Each electric motor is mounted ahead of one of the pair of wheels 14 and is drivingly connected to it through a transmission contained in a casing 19 and 20. The electric motors 17, 18 have respective casings on which are formed integral pairs of lugs 21, 22, 23, 24. Each lug has a socket presented towards the opposite side of the frame and the pairs of lugs are joined by two parallel bars 25, 26. These bars extend across the width of the vehicle and are secured to the frame 15 by means of a bracket 27. Each pair of lugs 21, 22 and 23, 24 also have holes which engage on slide bars 28, 29. The slide bars 28, 29 are secured to the body of the vehicle by end brackets 30, 31, 32, 33 respectively. The slide bars are parallel and extend lengthwise of the vehicle from a position adjacent the rear edge of the front door 11 to the rear upright wall of the body in which the doors 12 are fitted. These bars 28, 29 furthermore extend along the sides of the vehicle just inside the body side panels.

The frame 15 also carries part mudguards 34, 35 which partially enclose the respective rear wheels 14 of the vehicle.

Figure 3:
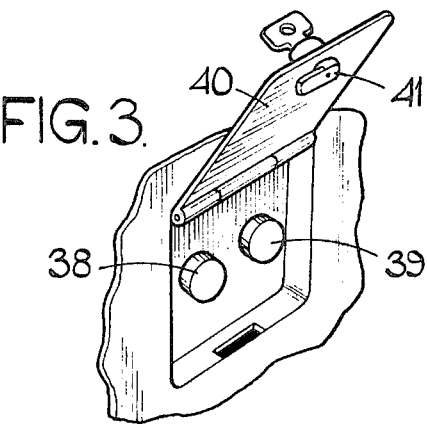
FIG. 3 is a fragmentary view of an externally accessible control panel.

Also carried at the forward end of the frame 15 is a control box 36. This contains all the electrical controls for governing actuation of the electric motors 17, 18 and is connected to driver controls through a cable indicated at 37 in FIG. 2. It is also connected to an external control panel illustrated in FIG. 3. This carries two control knobs 38, 39 and is enclosed by a flap 40 securable by means of a key operated lock 41. This control panel is located in one of the sides of the vehicle body 10 and near the back of the vehicle.

The frame 15 at its rearward end has a pair of upstanding apertured lugs 42, 43 engaging in respective slots (not illustrated) in the body 10. Adjacent these slots however, are positioned locking members, one of which is indicated in FIG. 1 at 44. When engaged, with the lugs 42, 43, the locks 44 prevent any movement of the frame 15 relatively to the vehicle body 10. In this position, the rear wall of the frame 15, which is flat, is substantially co-planar with the rear wall of the body 10 in which the doors 12 are fitted. In this position also, the battery pack 16 is contained wholly within the vehicle and is protected against access of dirt by appropriate sealing means between the body and that portion of the frame 15 containing the battery pack 16.

Should it be required to obtain access to the battery pack, the procedure is to operate the brakes on the front wheels, then release the locks 44. Next, a brake is applied to the front wheels 13. If no brake is fitted, these wheels must be chocked to prevent rotation and thus to prevent the vehicle moving. The two electric motors 17, 18 or one of them are next operated in reverse. This causes the assembly including the frame 15, battery pack 16, wheels 14, motors 17, 18, control box 36 and associated mechanisms to slide rearwardly along the slide bars 28, 29 until the rearmost position is reached at which the lugs 22, 24 engage the brackets 31, 33 at the rear ends of these bars 28, 29. At this position, the battery pack 16 is accessible from outside the rear of the vehicle as indicated by the ghost lines in FIG. 1. The cable 37 is long enough to accommodate this movement without disconnecting the drive from the driver controls. However, since it is impractical to carry out this operation from the driving position within the cab at the front of the vehicle and at the same time to observe the movement of the frame and associated equipment, the actuation of the motors is under the control of the knobs 38, 39 on a control panel shown in FIG. 3. This is positioned conveniently for observing progress.

The battery pack 16 may be removed either as one unit or as individual batteries and has connecting means to the control box 36. The partial removal of the battery pack may be for the purpose of charging, or maintenance, but these operations can be carried out without complete removal from the vehicle. After appropriate operations have been carried out, the frame 15 with battery pack 16, wheels 14, motors 17, 18 and control box 36 are return to their enclosed position within the vehicle by actuating the motors 17, 18 or one of them to drive the wheels 14 forwards until the lugs 21, 23 engage the forward end (30, 32) of the slide bars 28, 29. At this position, the locks 44 can be engaged in the lugs 42, 43 on the frame 15.

Other electric drive arrangement may be provided but the electric motor or motors must be attached to the movable assembly so as to drive the wheels without need for external power. The power for such drive is obtained from the battery pack 16 and correspondingly it is essential that this should remain operatively connected to the electrical drive.

In an alternative arrangement, there is an internal combustion engine which drives wheels at the same end of the vehicle and mounted on a frame similar to that shown in the drawings. There may be more than one pair of wheels to support the frame.

I claim:

1. A vehicle comprising a main body portion provided with a first pair of ground-engaging wheels, and also comprising a frame which carries at least one additional pair of ground-engaging wheels, power supply means including a battery pack, and transmission means connecting the power supply means to at least one wheel of said additional pair of ground-engaging wheels for driving the vehicle, the frame being connected to the main body portion by slide means which include bar means extending longitudinally of the vehicle and bearing means fitted on the bar means and slidable thereon, thereby permitting the frame to move relative to the main body portion so that the frame may occupy a closed position on the slide means in which the power supply means and the transmission means are enclosed within the vehicle and an extended position on the slide means in which the power supply means and the transmission means are accessible from outside the vehicle, said frame being movable on the slide means from one position to the other by maintaining the main body portion stationary and actuating the power supply means to drive the frame forwards or backwards along the slide means relative to the main body portion, and the vehicle further comprising releasable locking means for locking the frame to the main body portion when the frame is in its closed position and stop means preventing the frame from moving on the slide means beyond the extended position.

2. A vehicle as claimed in claim 1, in which the frame is drivable relative to the main body portion by employing the power supply means and the transmission means to rotate said at least one wheel of said additional pair of ground-engaging wheels.

3. A vehicle as claimed in claim 1 or 2, in which the transmission means comprise two transmission systems respectively connecting the power supply means to the two wheels of said additional pair of ground-engaging wheels.

4. A vehicle as claimed in claim 1 or 2 in which a control for actuating the power supply means is situated on the vehicle at a position from which an operator can observe movement of the frame between said closed and extended positions, said control being separate from normal controls whereby the vehicle is controlled by a driver.

* * * * *